(12) United States Patent
Kano

(10) Patent No.: US 7,296,115 B2
(45) Date of Patent: Nov. 13, 2007

(54) METHOD OF AND SYSTEM FOR CONTROLLING ATTRIBUTES OF A PLURALITY OF STORAGE DEVICES

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 10/944,129

(22) Filed: Sep. 17, 2004

(65) Prior Publication Data

US 2006/0064541 A1    Mar. 23, 2006

(51) Int. Cl.
*G06F 12/00*    (2006.01)

(52) U.S. Cl. ...................... 711/112; 711/117

(58) Field of Classification Search .............. 711/112, 711/170, 210, 209, 117, 171, 114; 707/200, 707/206, 100

See application file for complete search history.

(56) References Cited

U.S. PATENT DOCUMENTS

| | | | |
|---|---|---|---|
| 6,502,162 B2 | 12/2002 | Blumenau et al. | |
| 6,629,264 B1 | 9/2003 | Sicola et al. | |
| 6,643,667 B1 | 11/2003 | Arai et al. | |
| 6,751,719 B1 * | 6/2004 | Peloquin et al. | ............. 711/210 |
| 6,754,798 B1 * | 6/2004 | Peloquin et al. | ............. 711/210 |
| 6,854,035 B2 * | 2/2005 | Dunham et al. | ............. 711/117 |
| 6,941,439 B2 * | 9/2005 | Yagisawa et al. | ........... 711/202 |
| 6,996,670 B2 * | 2/2006 | Delaire et al. | ............... 711/114 |
| 7,082,503 B2 * | 7/2006 | Ito et al. | ...................... 711/152 |
| 7,171,624 B2 * | 1/2007 | Baldwin et al. | ............ 715/734 |
| 2004/0006616 A1 | 1/2004 | Quinn | |
| 2004/0068636 A1 * | 4/2004 | Jacobson et al. | ........... 711/203 |
| 2004/0153616 A1 | 8/2004 | Nakamura et al. | |
| 2004/0268038 A1 * | 12/2004 | Nagasoe et al. | ............ 711/114 |
| 2005/0086430 A1 | 4/2005 | Allen et al. | |
| 2005/0120175 A1 * | 6/2005 | Shimada et al. | ............ 711/114 |
| 2006/0047924 A1 * | 3/2006 | Aoshima et al. | ............ 711/161 |

OTHER PUBLICATIONS

Performance Efficient Multiple Logical Unit Number Mapping for Redundant Array of Independent Disks, IBM Technical Disclosure Bulletin, May 1996, pp. 273-274. cited by other.*
Hitachi Freedom Storage™, Lightning 9900™—Hitachi TrueCopy User and Reference Guide, publ. by Hitachi Data Systems, (2003), pp. 107-114.

* cited by examiner

*Primary Examiner*—Pierre-Michel Bataille
(74) *Attorney, Agent, or Firm*—Townsend and Townsend and Crew LLP

(57) ABSTRACT

A method of, and a system for, controlling attributes of a group of storage devices presents to a user a set attribute choices for one or more groups of storage devices. The user interacts with the presentation of the set of attribute choices to choose attributes for the group. In response to selection of attribute choices, the system verifies the selected attribute choices. The system automatically applies the verified selected attributes to the group.

40 Claims, 17 Drawing Sheets

| | 301 | 303 | 305 | 307 |
|---|---|---|---|---|
| | GROUP NUMBER | GROUP NAME | SERIAL NUMBER | L_DEV NUMBER |
| | 1 | DIVISION 1 | 50121 | 200,201 |
| | | | 58232 | 10,11,12,13 |
| | 2 | DIVISION 2 | 23121 | 1,2,3,4 |
| | 3 | FINANCE | 59231 | 100,101,102 |
| | ... | ... | ... | ... |

Fig. 3

| 401 | 403 | 405 | 407 |
|---|---|---|---|
| PORT | WWN | LUN | L_DEV NO. |
| 1 | 10.00.00.00.C9.36.07.D7 | 1 | 1 |
| 1 | 10.00.00.00.C9.36.07.D7 | 2 | 2 |
| 1 | 10.00.00.00.C9.36.07.D7 | 3 | 3 |
| | | | |
| 2 | 10.00.00.00.C9.36.07.01 | 1 | 10 |
| 2 | 10.00.00.00.C9.36.07.01 | 2 | 11 |
| 2 | 10.00.00.00.C9.36.07.01 | 3 | 12 |
| 2 | 10.00.00.00.C9.36.07.01 | 4 | 13 |
| | | | |
| J | XX.XX.XX.XX.XX.XX.XX | K | L |

Fig. 4

| | 501 | 503 | 505 |
|---|---|---|---|
| | L_DEV NO. | CAPACITY | PURPOSE |
| | 10 | 1MB | COMMAND DEVICE |
| | ... | ... | ... |
| | 101 | 8GB | VOLUME SNAPSHOT |
| | 102 | 8GB | VOLUME SNAPSHOT |
| | 103 | 100GB | DIFFERENTIAL SNAPSHOT |
| | ... | ... | ... |

Fig. 5

| 601 | 603 | 605 | 607 |
|---|---|---|---|
| L_DEV NO. | PARITY GOUP ID | OFFSET ON PARITY GROUP | SIZE OF L_DEV |
| 1 | 1 | 0 | 1GB |
| 2 | 1 | 1073741824 | 1GB |
| 3 | 2 | 2147483648 | 1GB |
| ... | ... | ... | ... |

Fig. 6

| 701 | 703 | 705 |
|---|---|---|
| TARGET VOLUME | CAPABILITY | SCHEDULE |
| 1 | VOLUME SNAPSHOT | EVERY DAY |
| 10 | DIFFERENTIAL SNAPSHOT | EVERY HOUR |
| ... | ... | ... |

Fig. 7

| | | | | | |
|---|---|---|---|---|---|
| 801 — | SOURCE | 10 | | | |
| 803 — | SNAPSHOT NO. | 1 | 2 | ... | 12 |
| 805 — | SNAPSHOT DATE/TIME | 01/31/04 11:00 | 12/31/04 00:00 | ... | 01/01/05 11:00 |

Fig. 8

| 901 | SOURCE | 1 | | | |
|---|---|---|---|---|---|
| 903 | TARGET | 201 | 201 | ... | 214 |
| 905 | SNAPSHOT DATE/TIME | 01/01/05 12:00 | 12/18/04 12:00 | ... | 12/31/04 12:00 |
| 907 | LAST SNAPSHOT | X | | | |

Fig. 9

| FUNCTION 1511 | EXCLUSIVE FUNCTION 1513 |
|---|---|
| SNAPSHOT | READ-ONLY |
| DIFFERENTIAL SNAPSHOT | READ-ONLY |
| READ-ONLY | SNAPSHOT, DIFFERENTIAL SNAPSHOT |
| ... | ... |

Fig. 15

| STATUS |
|---|
| MIRRORED SECONDARY VOLUME — 1911 |
| REMOTE COPIED VOLUME — 1913 |
| ... |

Fig. 19

| LUN /2511 | CAPACITY /2513 | ATTRIBUTE /2515 | | | |
|---|---|---|---|---|---|
| | | VOLUME SNAPSHOT | DIFFERENTIAL SNAPSHOT | READ-ONLY | ... |
| 1 | 8GB | YES | NO | NO | ... |
| 2 | 8GB | NO | YES | NO | ... |
| 3 | 10GB | NO | NO | YES | ... |
| ... | ... | ... | ... | ... | ... |

Fig. 20

| GROUP | LU | ATTRIBUTE | | | | |
|---|---|---|---|---|---|---|
| | | VOLUME SNAPSHOT | DIFFERENTIAL SNAPSHOT | READ-ONLY | ... | NOTES |
| FINANCE | 1 | ON● OFF ○ | ON● OFF ○ | ON● OFF ○ | ... | Mirror secondary volume |
| | 2 | ON● OFF ○ | ON● OFF ○ | ON● OFF ○ | ... | Remote Copy secondary volume |
| | 3 | ON● OFF ○ | ON● OFF ● | ON● OFF ● | ... | |
| ... | ... | ... | ... | ... | ... | |

CANCEL 2013  BACK 2015  NEXT 2017

Fig. 22

| GROUP | OK | REQUIRED FREE SPACE | | | | |
|---|---|---|---|---|---|---|
| | | 50121 | 58232 | 23151 | 59231 | ... |
| 1 | NO | 8GB X 7 X 8 | 8GB X 7 X 1 | 0 | 0 | ... |
| 2 | YES | 0 | 0 | 8GB X 7 X 1 | 0 | ... |
| 3 | YES | 0 | 0 | 0 | 0 | ... |
| ... | ... | ... | ... | ... | ... | ... |
| TOTAL REQUIRED STORAGE | | 8GB X 7 X 8 | 8GB X 7 X 1 | 8GB X 7 X 1 | 0 | ... |
| CURRENT AVAILABLE STORAGE | | 8GB X 7 X 1 | 8GB X 7 X 10 | 8GB X 7 X 1024 | 8GB X 7 X 256 | ... |

CANCEL 2217  BACK 2219  FINISH 2221

METHOD OF AND SYSTEM FOR CONTROLLING ATTRIBUTES OF A PLURALITY OF STORAGE DEVICES

BACKGROUND OF THE INVENTION

The present invention relates generally to the field of computer data storage systems, and more particularly to a method of, and a system for, controlling storage devices in a storage system. In such storage systems each storage device has certain attributes relating to the operation of that storage device, for example, mirroring, snapshot management, access security, etc. In operation of the storage system these attributes must be defined when the system is first initialized, and may later be changed as the needs of users of that system change.

Businesses and other organizations do a substantial amount of their computing in a networked client-server environment. Members of the organization often do their work using networked personal computers, and then store their data either locally or in shared storage. This shared storage is often implemented as a Storage Area Network (SAN) environment. A SAN is a high speed network that allows the establishment of direct connections between hosts and storage devices.

SANs create new methods of attaching storage to host computers. These new methods provide improvements in both availability of storage, reliability, security of data, and performance. In a large installation, a SAN may include thousands of logical units (typically individual hard disk drives), embodied in multiple storage arrays. Normally, the logical units are divided into groups, and each department or division within the organization is allocated a group.

A group is often used to provide dedicated shared storage for the corresponding department or division. Grouping of logical units allows a system administrator to allocate sufficient storage to a department or division and it segregates the data of the department or division from the data of others. One method for assigning devices to groups is described in commonly assigned U.S. patent application entitled "Techniques for Managing a Storage Environment," Ser. No. 10/374,319, filed Feb. 25, 2003. There is currently no means, however, by which an administrator can set capabilities like mirroring, prohibiting access except by authorized hosts, and snapshot management features for a group as a whole. Instead, the administrator typically sets such features individually for each logical unit. With groups including thousands of logical units, and often multiple storage systems, setting the attributes for each logical unit is a time consuming, error prone and tedious task.

BRIEF SUMMARY OF THE INVENTION

The present invention provides a method of, and system for, controlling attributes of a plurality of storage devices. The attributes include capabilities such as whether the storage devices are read-only or read/write, or whether the storage device uses volume snapshot or differential snapshot technology. The storage devices are preferably organized into groups. In a preferred embodiment the system and method of the present invention present to a user, typically an administrator of all or a portion of the SAN, a set of attribute choices for one or more groups of storage devices. The user interacts with the presentation of the set of attribute choices to choose attributes for the group. In response to selection of attribute choices, the system and method of the present invention verify the selected attribute choices. The system and method of the present invention automatically apply the verified selected attributes to each of the storage devices in the group. Verification may include verifying that there are sufficient resources to implement the selected attributes, that selected attributes are consistent with each other, or that the selected attributes do not conflict with various preassigned attributes.

The storage devices preferably comprise logical units in storage subsystems. A group typically comprises a set of logical units associated with one or more storage subsystems. To enable setting of the attributes for all of the devices in a group, the system and method of the present invention typically maintains a table or the like of the storage subsystems and logical units forming each group. The system and method of the present invention also usually maintain a table or the like that lists the available attributes for each group. A system administrator then preferably uses the tables to apply the selected attributes to the logical units of the groups.

In one embodiment a method of controlling attributes of a plurality of storage devices includes defining a group of storage devices, presenting attribute choices for the defined group to enable selection thereof on a group basis, and in response to selection of attribute choices, automatically applying the selected attributes to the group of storage devices. In another embodiment, a system for controlling attributes of a plurality of storage devices includes a user interface for presenting a set of attribute choices for a group of storage devices and apparatus for applying to the group of storage devices, attributes chosen from the set of attribute choices.

A user interface for selecting attributes for operation of a storage system having storage devices which are placed in groups to operate according to attributes common to members of that group, includes a first display portion to provide identification of the group, a second display portion to display attributes for enabling a user of the user interface to select attributes from those displayed, and a third display portion to allow the user to apply the selected attributes to the storage devices in the group.

BRIEF DESCRIPTION OF THE DRAWINGS

FIG. 3 is a table showing relationships among groups, storage subsystems, and logical device assignments.

FIG. 4 is a table showing relationships among storage subsystem ports, World Wide Names, logical units and logical devices.

FIG. 5 is a table showing an example of a free volume pool.

FIG. 6 is a table showing parity group assignments.

FIG. 7 is a table for snapshot scheduling.

FIG. 8 is a differential snapshot table.

FIG. 9 is a volume snapshot table.

FIG. 15 is an illustration of an example of a mutually exclusive function table.

FIG. 19 is an illustration of an example of a table of exclusive volume conditions.

FIG. 20 is an illustration of a user interface for showing logical unit attribute selections.

FIG. 22 is an illustration of a user interface showing hardware resource verifications.

DETAILED DESCRIPTION OF THE INVENTION

Figure 1:
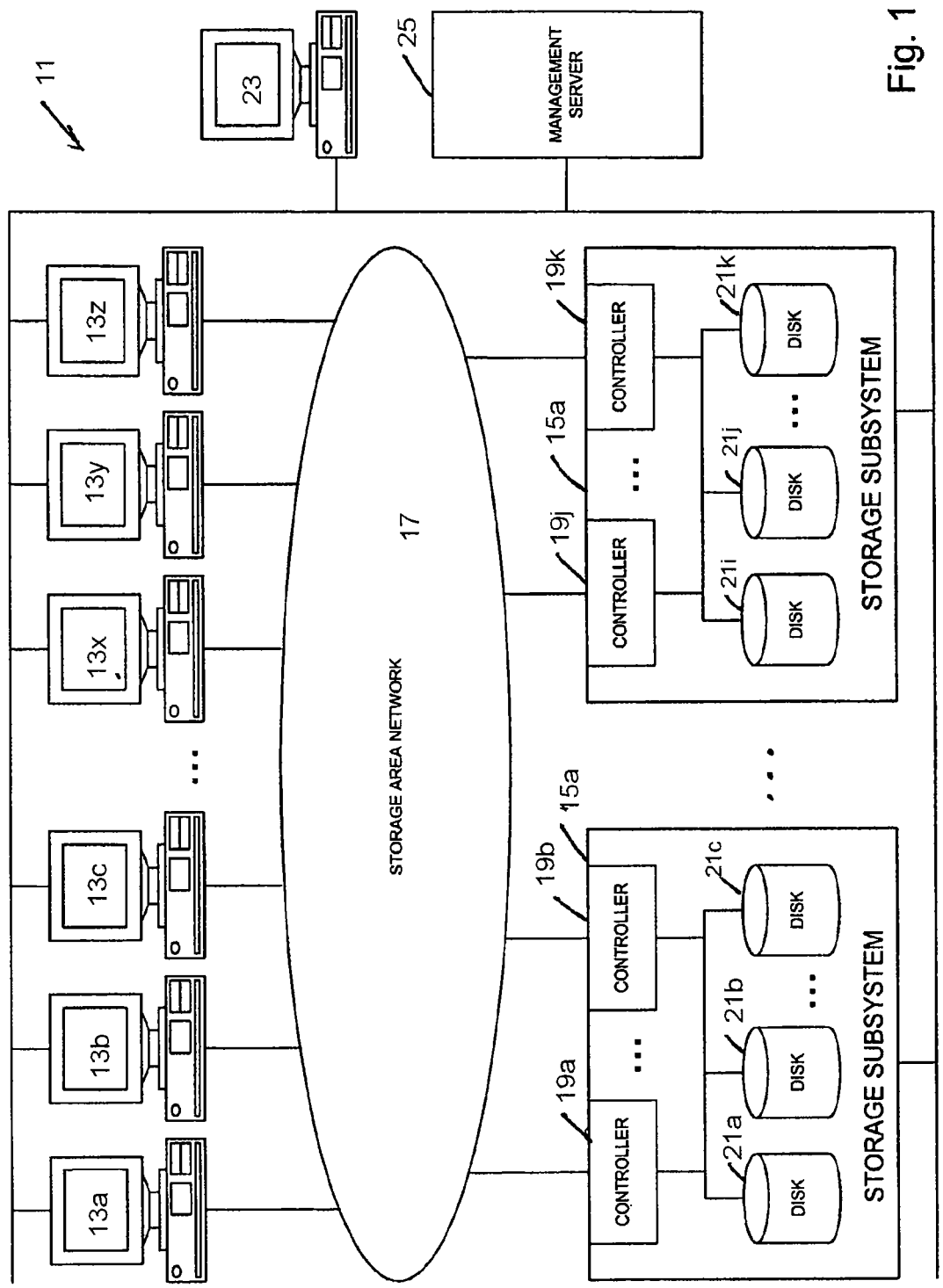
FIG. 1 is a block diagram of a storage system according to one embodiment of the invention.

Referring now to the drawings, and first to FIG. 1, a preferred embodiment of a storage area network (SAN) is designated generally by the numeral 11. SAN 11 includes a plurality of host computers 13 and a plurality of storage subsystems 15 interconnected by a Storage Area Network fabric 17. In the illustrated embodiment, each host is a personal computer having a CPU, memory, and a network interface card.

Each storage system 15 includes one or more controllers 19 and a plurality of discs 21. Storage subsystems 15 may be implemented using known Redundant Array of Independent Disc (RAID) technology. Each controller 19 includes processors, memory, network interface cards, and typically a Fibre Channel port (or other suitable interconnection depending upon the desired protocol). Each storage subsystem 15 has the capability to store data using SCSI (or other) commands on its logical units. Each host 13 may store its data on a Logical Unit (LU) provided by a storage subsystem 15.

SAN 11 will usually include a management console 23 and a management server 25. Management console 23 and management server 25 are typically computers that include CPU, memory, and network interface cards. Management console 23 provides a user interface by which a user, for example, a system administrator, can interact with SAN 11 to provide management functions, for example, configuration and maintenance operations. Management server 25 manages the storage assets of the system, for example, maintaining tables of system assets, characteristics and operations. Hosts 13, management console 23, management server 25, and storage systems 15 are preferably interconnected by a Local Area Network (LAN) or other appropriate communication means. Pool management controls the overall SAN operations with regard to availability and use of the storage devices.

Figure 2:
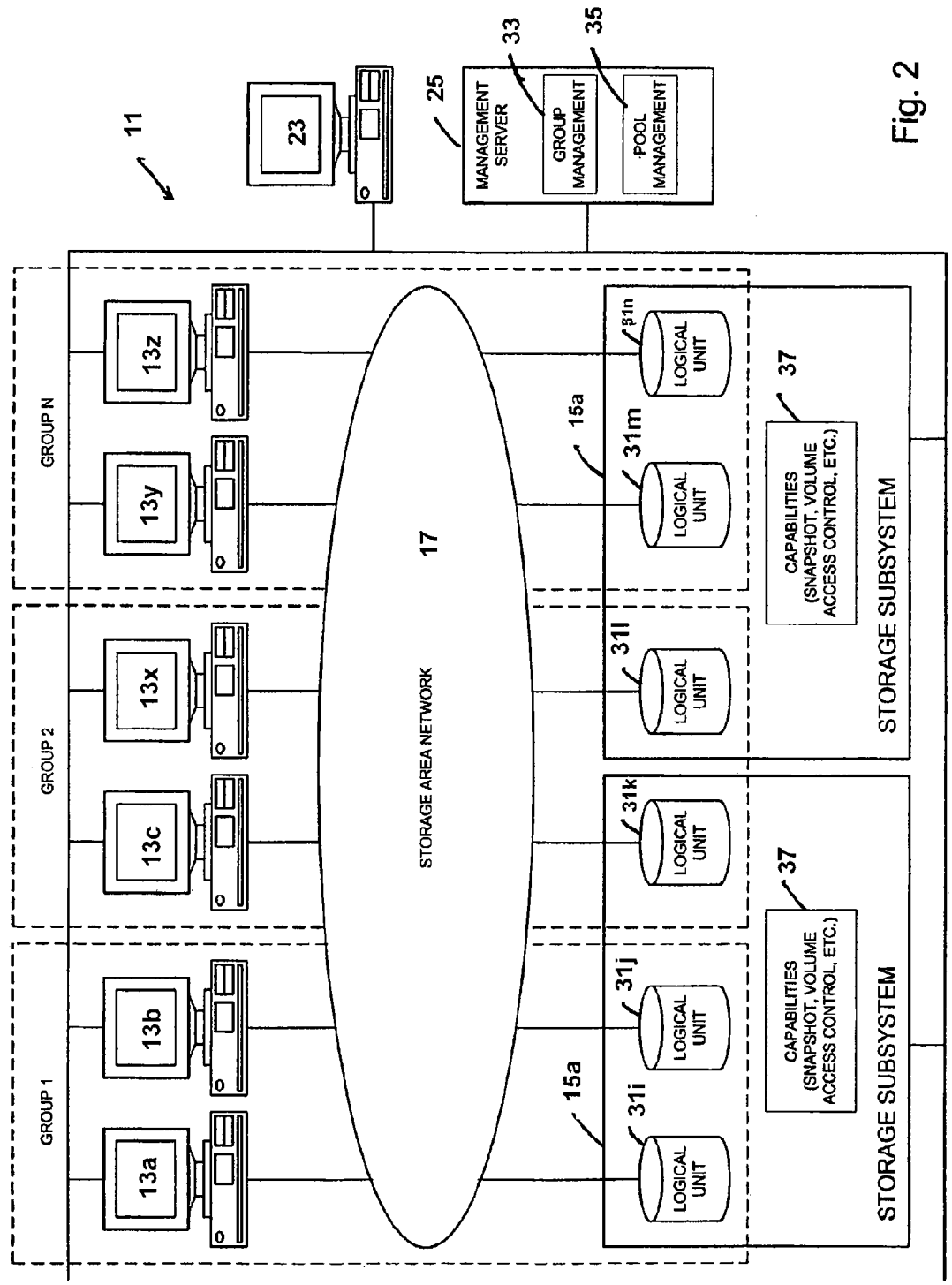
FIG. 2 is a further block diagram of a storage system according to one embodiment of the invention.

FIG. 2 is a logical and functional block diagram of one embodiment of a system according to the invention. In the embodiment of FIG. 2, hosts 13 and logical units 31 are organized into groups. From the perspective of a host application, its data is stored on a logical unit 31, and the system infrastructure is transparent to the host application.

In the embodiment of FIG. 2, system management functions are distributed across SAN 11. Management server 25 provides a group management function 33 and a pool management function 35. Group management function 33 allocates logical units 31 to the various organizational groups and parity groups in a manner described next.

FIG. 3 is a table illustrating the allocation of logical units among organizational groups. As shown in FIG. 3, each group has a Group Number 301 and a Group Name 303. The storage subsystems allocated to a group are each identified by a Serial Number 305. Note that as shown in FIG. 2, a single storage subsystem (and therefore its serial number in FIG. 3) may be allocated to more than one group, and a group may be serviced by more than one storage subsystem. For example, as shown in FIG. 3, Group Number 1 is serviced by two storage subsystems. The Logical Devices within a storage subsystem assigned to each group are identified by an L_DEV number 307, as shown in the last column in FIG. 3. As shown in FIG. 3, Group Number 1 is assigned to Division 1. The storage subsystems assigned to Group Number 1 are those with Serial Numbers 50121 and 58232. The L_DEV number for the storage subsystem 50121 assigned to Group 1 are 200 and 201. The L_DEV numbers for the storage subsystem 58232 assigned to Group 1 are 10, 11, 12 and 13.

FIG. 4 is a table illustrating relationships among ports 401, Worldwide Names (WWN) 403, Logical Unit Numbers (LUN) 405 and Logical Device (L_DEV) Numbers 407. As illustrated in FIG. 4, each port of a storage subsystem 15 is identified by a globally-unique WWN. For example, in the table of FIG. 4, port 1, which has associated therewith three LUNs, is identified by the WWN "10.22.22.C9.36.07.D7." As shown in FIG. 4, the storage subsystem includes one Logical Device for each Logical Unit. L_DEV numbers within a storage subsystem are unique. LUNs within a storage subsystem are not unique; however, the combination of WWN and a LUN is unique for each Logical Unit. Logical units within a storage subsystem 15 are addressed with a device ID, which identifies the port and a LUN. From the host's perspective, a volume is identified by the subsystem device ID and LUN. From the controller's perspective, a volume is identified by its L_DEV number. The relationship between L_DEV numbers and LUNs is shown in FIG. 4.

Logical Devices not allocated to a Group are assigned to a free volume pool. Pool management function 35 manages the pool of free volumes. These are usually managed using a table. An exemplary table of the free volume pool for a storage subsystem is illustrated in FIG. 5. The table of FIG. 5 identifies each L_DEV number 501 in the free volume pool, and lists for each L_DEV number, its capacity 503 and assigned purpose 505. The purposes listed in the table of FIG. 5 include command device, volume snapshot and differential snapshot. Such purposes are usually defined when the storage subsystem is initialized.

In RAID systems logical devices are associated with other logical devices to provide parity groups. These parity groupings allow error detection and correction using parity bits. A table of the grouping of Logical Devices in a storage subsystem into Parity Groups is illustrated in FIG. 6. In the example, L_DEV numbers in column 601 are assigned to a Parity Group as shown in column 603. The offset of the each L_DEV into its associated Parity Group is given in column 605 of the table of FIG. 6. The size of each L_DEV is listed in column 607.

In the embodiment of FIG. 2, storage subsystems 15 manage storage hardware capabilities 37. Storage hardware capabilities include such things as volume access control, command device capability, volume snapshot protection capability and differential snapshot protection capability, as well as other functions. As is well known to those skilled in the art, volume access controls write access and provides for read only volumes. When a logical unit is marked as read only, the controller for the logical unit returns an error in response to a SCSI write command.

The command device is a dedicated logical volume on a storage subsystem that functions as an interface to Command Client Control (CCI) software on a UNIX(r)/PC host. The command device is dedicated to CCI communications and cannot be used by any other applications. The command device accepts read and write commands that are executed by the storage subsystem. The command device also returns read requests to the UNIX(r)/PC host. The volume designated as the command device is used only by the storage subsystem.

Volume snapshot protection creates snapshots based upon a defined schedule using mirroring capability. A scheduler module table controls the taking of snapshots by instructing the volume snapshot module when to take a snapshot. A scheduler table is illustrated in FIG. 7. As shown there, the scheduler table indicates the target volume 701 for the snapshot, the type 703 of snapshot to be taken, and the schedule 705 for taking the snapshot (hourly, daily, or at other interval). After a snapshot is taken, the created snapshot is registered in a table of taken snapshots. A sample table of volume snapshots is illustrated in FIG. 8. The table of FIG. 8 lists the source volume 801 from which the snapshot was taken, the number 803 of the snapshot, and the date and time 805 that the snapshot was taken. The snapshots are stored in target volumes assigned from the free volume pool. When this attribute is ON for the source logical unit, the snapshot module makes and synchronizes a pair between the source and target volumes and then splits the pair. The splitting of the pair may wait until the host indicates a consistency point, if it is necessary.

The differential snapshot protection capability creates snapshots based upon the defined schedule of the differential capability on the storage subsystem. The differential snapshot capability preserves the copy-on-write data for the target volume and creates a snapshot of the volume from the preserved copy-on-write data and the primary volume. Differential snapshots (as opposed to non-differential snapshots) are taken based upon the appropriate attribute being set for that logical unit. If the attribute is ON for the logical unit, the module takes copy-on-write data from the host and stores it with the logical block address in time order for the target volume. In normal operation, microcode controlling the scheduler instructs the taking of a snapshot based upon the defined schedule and stores a checkpoint at the end of the copy on write data. The insertion of the checkpoint may wait until the host indicates a consistency point, if it is necessary. A table of taken differential snapshots is illustrated in FIG. 9. The source volume from which the snapshot was taken is identified in row 901. The target volume in which each snapshot is located is listed in row 903. The date and time of each snapshot is listed in row 905. The last snapshot taken is indicated in row 907.

Figure 10:
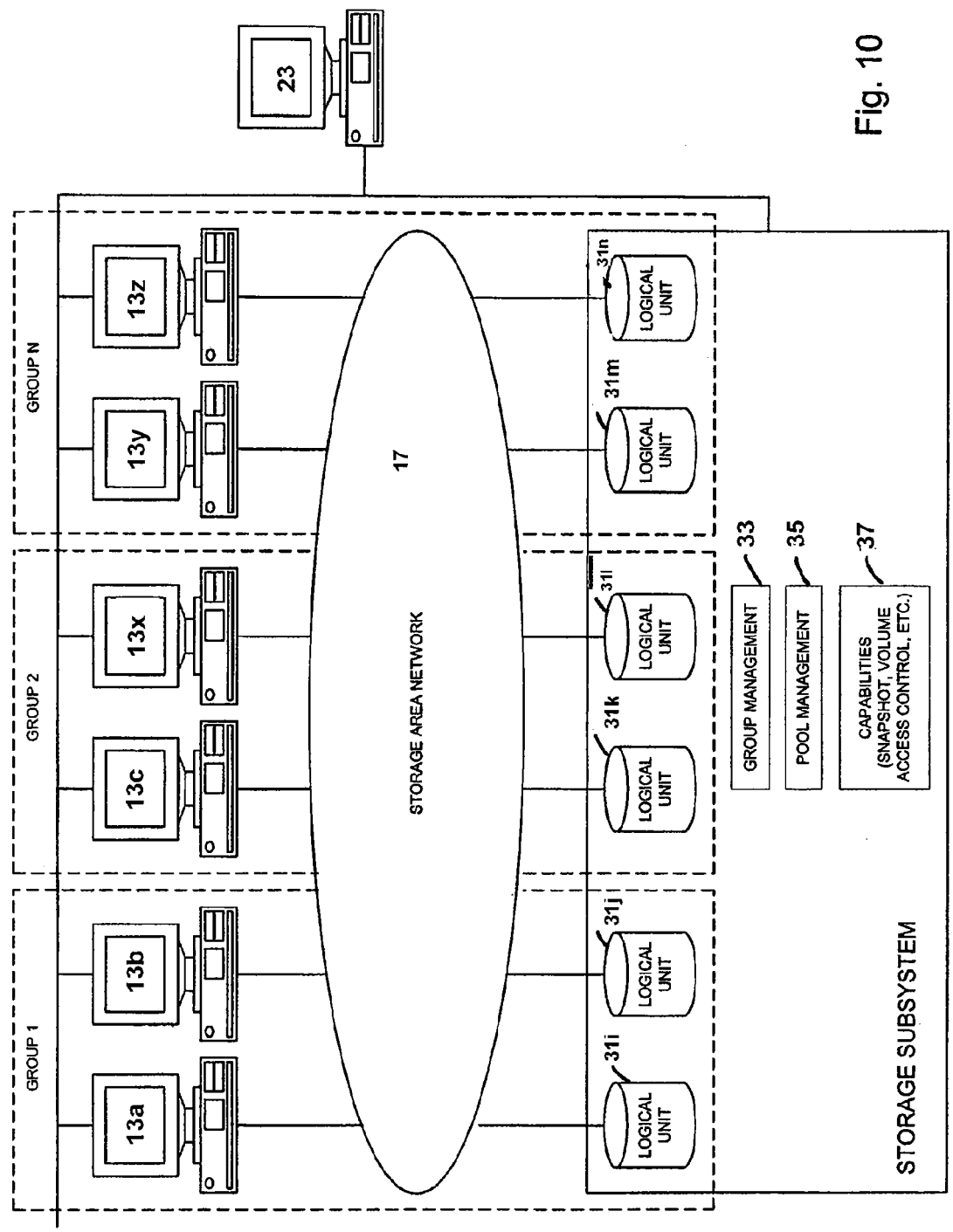
FIG. 10 is a further logical block diagram of a system according to another embodiment of the invention.

A second embodiment of the system of the present invention is illustrated in FIG. 10. In the embodiment of FIG. 10, group management, pool management, and capabilities management, as described with respect to FIG. 2, are performed within the storage subsystem itself without need for a separate management server. Such a system operates in the same manner as the system depicted in FIG. 2 with these management functions being accessed using the console.

Figure 11:
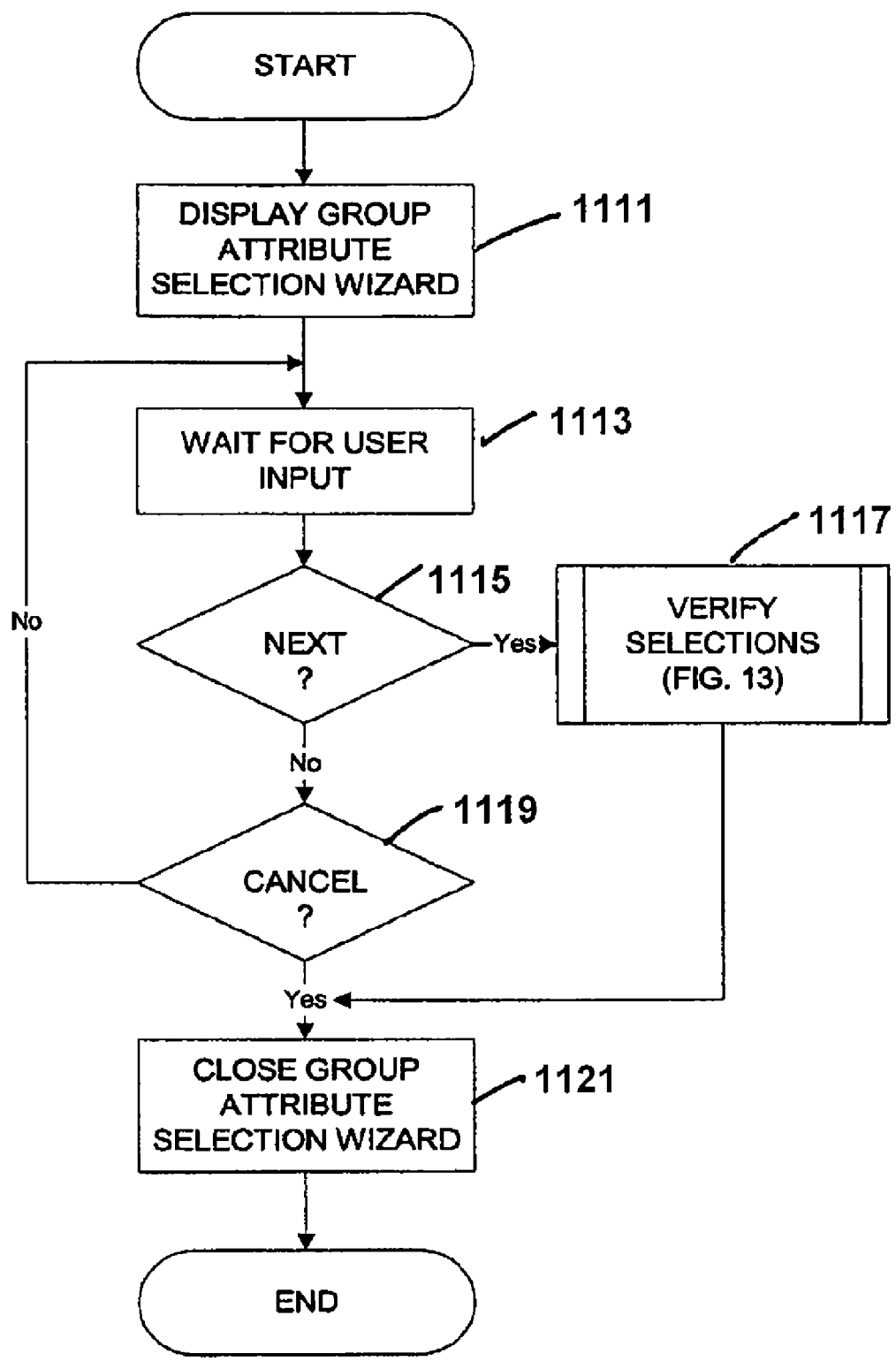
FIG. 11 is a flowchart of a process for selecting group attributes.
Figures 12, 25:
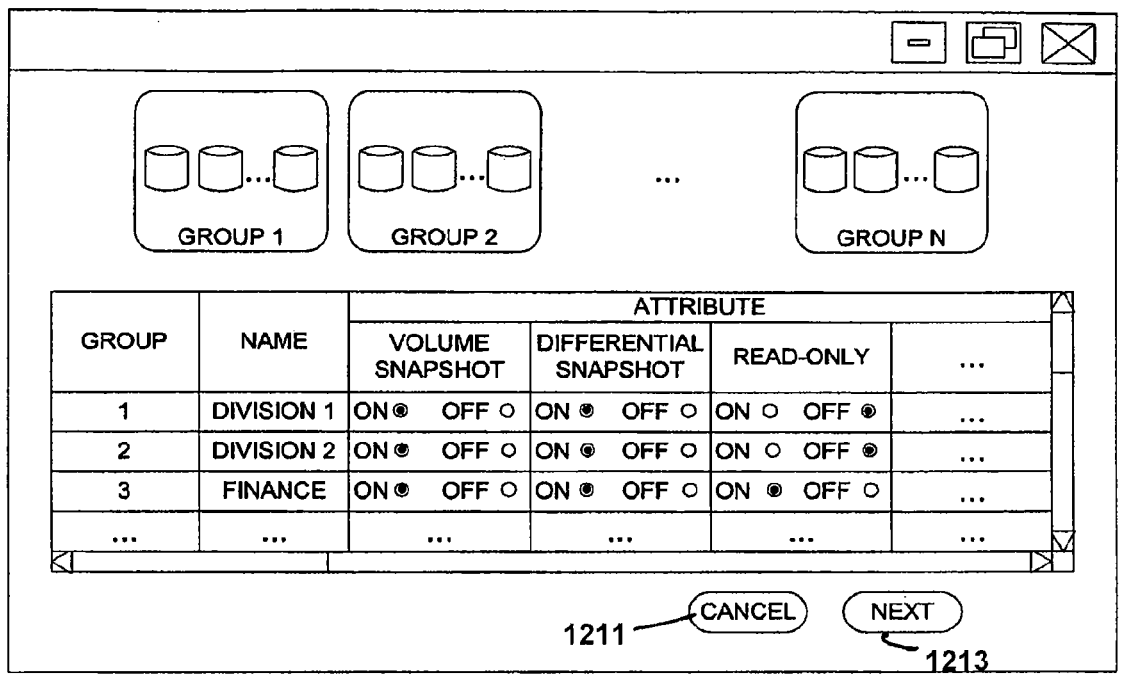
FIG. 12 is an illustration of an example of a user interface for attribute selection.
FIG. 25 is a table of a logical unit attributes.

FIG. 11 is a flow chart illustrating a method implemented in providing a user interface for selection of attributes in a preferred embodiment of the present invention. A typical user interface is shown in FIG. 12. As shown in FIG. 11, the first step is for the system to display a group attribute selection wizard, as indicated at block 1111, such as illustrated in FIG. 12. For each group, there are provided attribute selection controls. In the example of FIG. 12, the attribute selection controls are provided as radio buttons. Of course drop down lists, or other techniques known to those skilled in the art can also be used for assigning selected attributes to the groups. After displaying the group attribute selection window, the system waits for user input at block 1113. After the user has made the desired selections, as shown in FIG. 12, the attribute selection window includes a CANCEL button 1211 and an NEXT button 1213. If, as indicated at decision block 1115 in FIG. 11, the user selects the NEXT button, then the system verifies the selected attributes, as indicated generally at block 1117, and as will be discussed below in detail with respect to FIG. 13. If the user selects the CANCEL button, as indicated at decision block 1119, the system closes the group attribute selection wizard, as indicated at block 1121, and processing ends without any group attributes having been set or changed.

Figure 13:
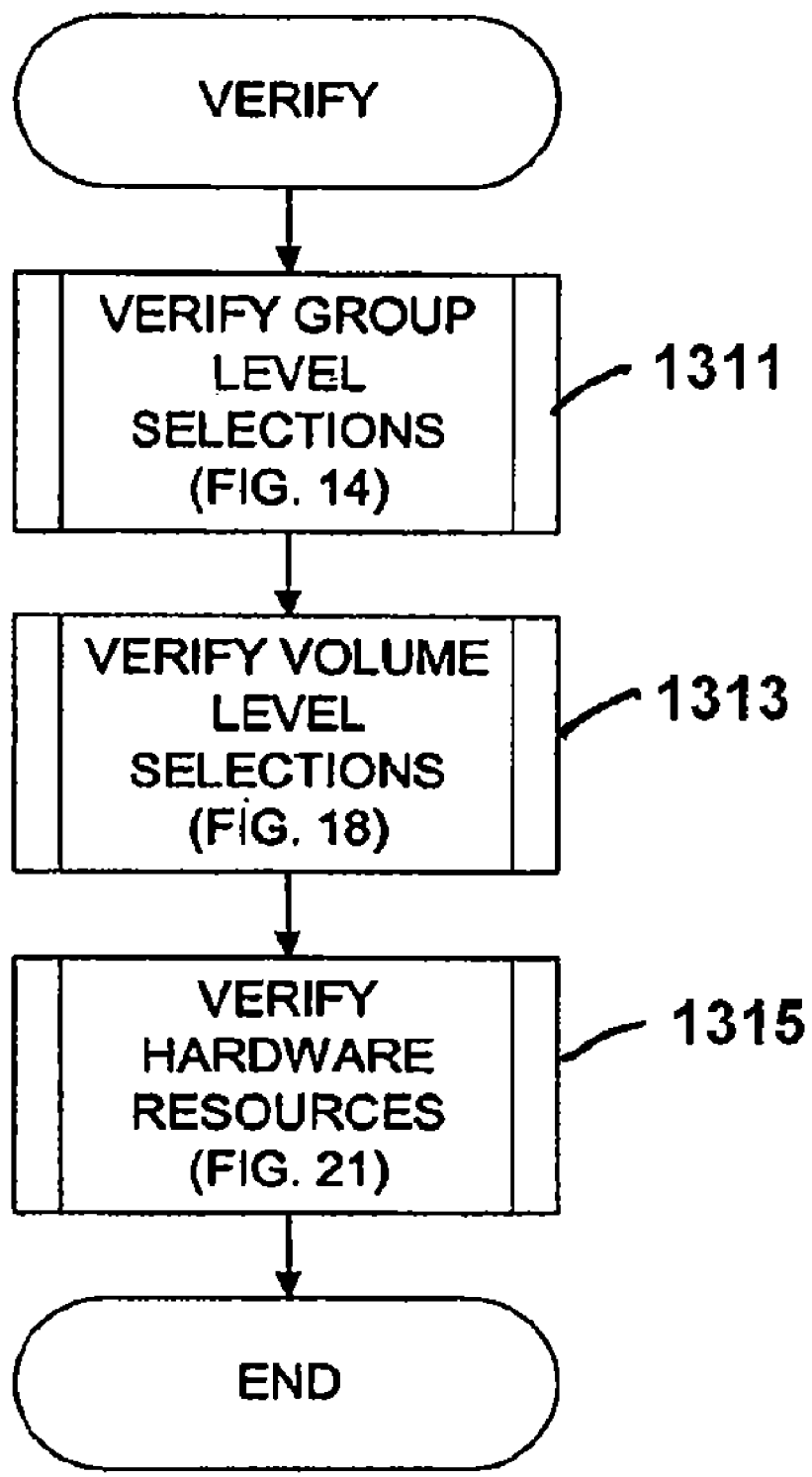
FIG. 13 is a flowchart of a process for verifying attribute selections.

FIG. 13 is a high level flowchart of a process for verifying the selections indicated generally at block 1117 of FIG. 11. The process of FIG. 13 verifies the selections at three levels. First, the process verifies the consistency of the group level selections, as indicated generally at block 1311 and discussed in detail with respect to FIG. 14. Then, the process verifies the selections at the logical unit level, as indicated generally at block 1313 and discussed in detail with respect to FIG. 18. Finally, the process verifies the availability of hardware resources for the selections, as indicated generally at block 1315 and discussed in detail with respect to FIG. 21.

Figure 14:
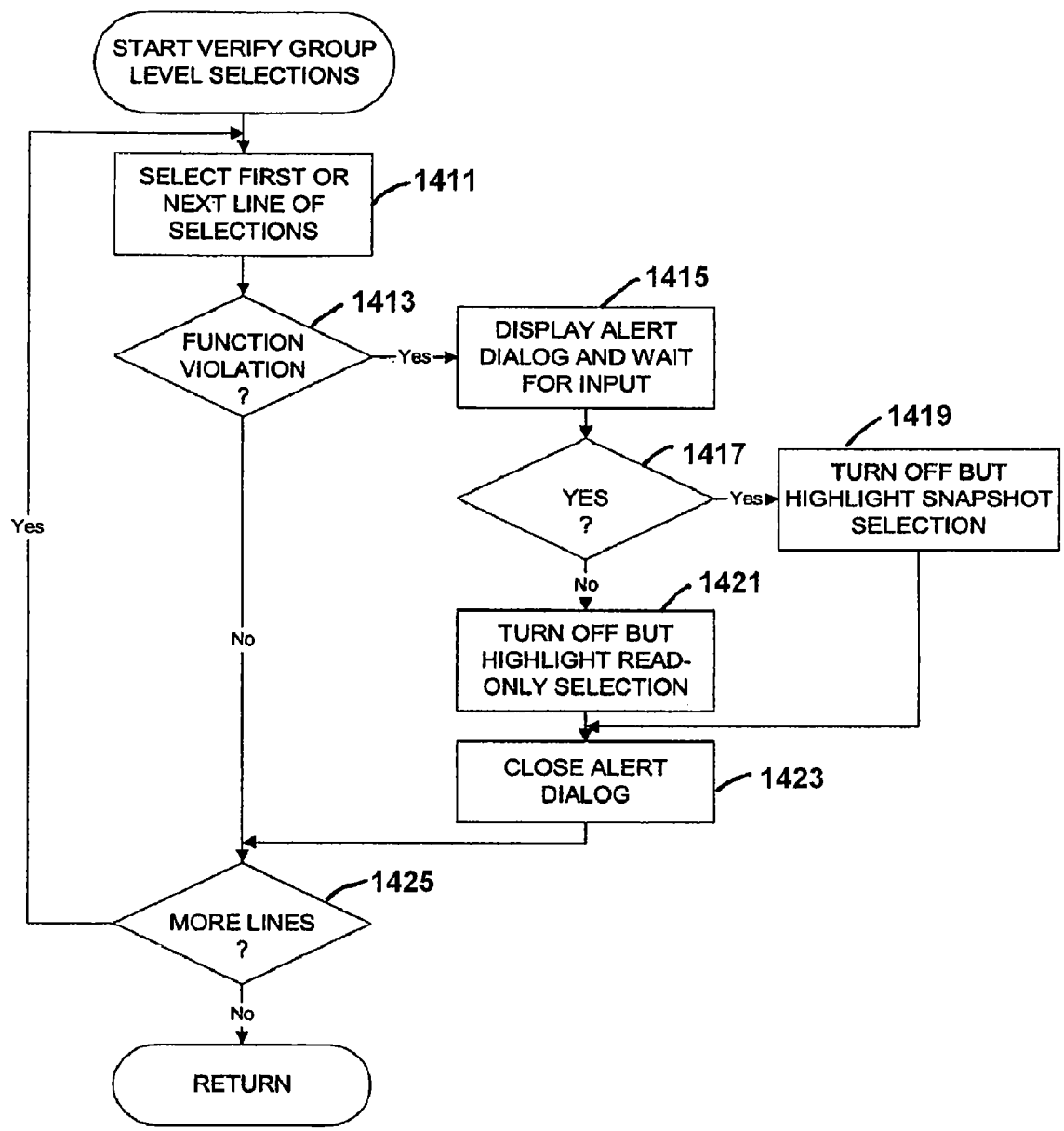
FIG. 14 is a flowchart of a process for verifying group level selections.
Figure 16:
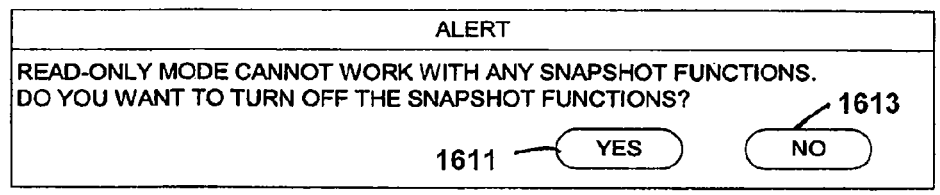
FIG. 16 is an illustration of an example of an alert dialog.

The process of FIG. 14 selects a first or next line of selections entered in the selection wizard of FIG. 12, at block 1411. Then, the process determines, at decision block 1413, if the selections violate mutually exclusive functions. Certain attributes are inconsistent with other attributes. FIG. 15 is a table of examples of mutually exclusive functions. The table of FIG. 15 has a function column 1511 and an exclusive function column 1513. As shown in the table of FIG. 15, the snapshot functions are not consistent with read-only volumes. If the process of FIG. 14 determines, at decision block 1413, that the selections violate the conditions shown in the table of 15, the process displays an alert dialog and waits for user input, at block 1415. An example of an alert dialog is illustrated in FIG. 16. The alert dialog notifies the user that read-only mode cannot work with any snapshot function and prompts the user to correct the selection. The example of FIG. 16, the alert dialog asks if the user wants to turn off the snapshot functions. Processing according to FIG. 14, waits until the user selects either YES button 1611 or NO button 1613 of the alert dialog. If, as determined at decision block 1417, the user selects YES button 1611, the process turns off, but highlights, the snapshot selection in the wizard of FIG. 12, as indicated at block 1419. If the user selects the NO button 1613, the process turns off, but highlights, the read-only selection in the wizard of FIG. 12, as indicated at block 1421. After the user has made a choice in the alert dialog, the process closes the alert dialog, at block 1423, and tests, at decision block 1425, if the there are more lines. If so, processing returns to block 1411; if not, processing returns to FIG. 11.

Figure 17:
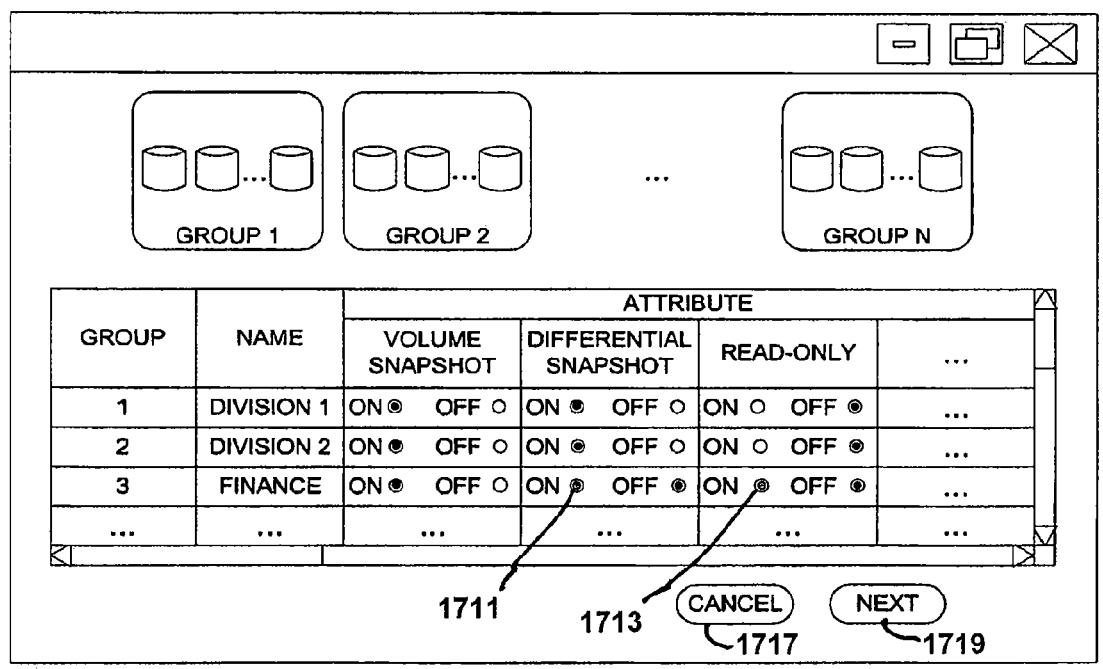
FIG. 17 is an illustration of the user interface of FIG. 12 after group level verification.

After, processing according to FIG. 14, the group attribute selection wizard may be redisplayed, as shown in FIG. 17. In FIG. 17, any mutually exclusive selections have been corrected according to FIG. 14 processing described above. Any changed attributes may be highlighted, as indicated at 1711 and 1713, so that the user can find the change easily and decide if he or she wants to accept the change. The user can not accept the change by selecting a highlighted choice. The user may either proceed with the attribute selection process, by selecting the NEXT button 1715, or terminate the selection process, by selecting the CANCEL button 1717. If the user selects NEXT button 1715, processing continues according to FIG. 13.

Figure 18:
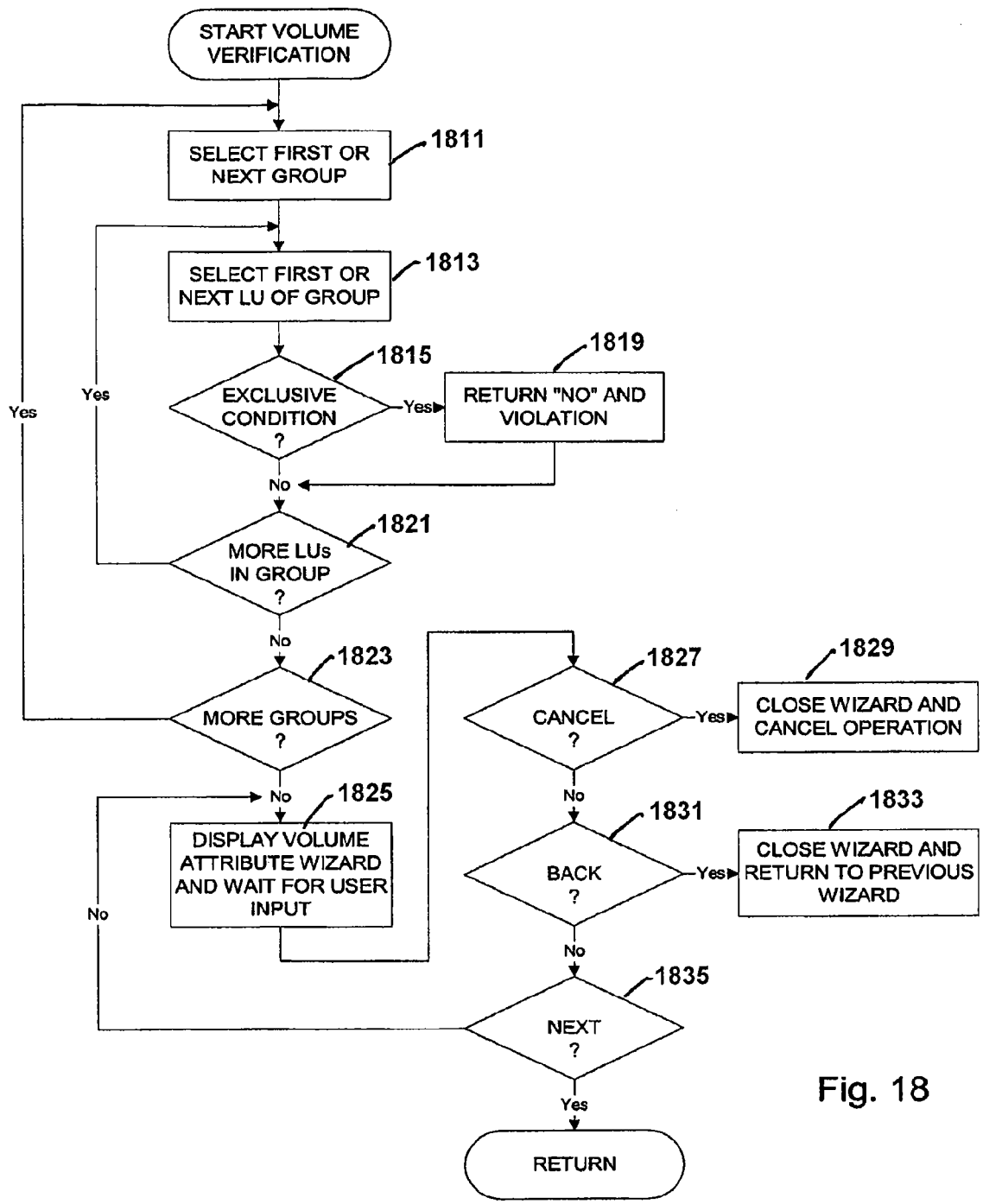
FIG. 18 is a flowchart of a process for verifying logical unit level attribute selections.

After all group level selections have been verified, processing proceeds to volume level verification, an example of which is illustrated in FIG. 18. At the logical unit level, certain volumes assigned to a group may have been preassigned functions that are inconsistent with certain group attributes. A table of exclusive volume conditions is illustrated in FIG. 19. For example, a particular volume may be a mirrored secondary volume 1911, which means that the volume has been designated a secondary volume on a local mirror inside the storage subsystem. A particular volume may be a remote copied volume 1913, which means that the volume has been designated a secondary volume on a remote copy between two storage subsystems. Mirrored secondary volumes and remote copy volumes are not available to be assigned group functions.

Processing according to FIG. 18, starts at block 1811, where a first or next group is selected. Then a first or next logical unit of the selected group is selected, at block 1813. The process determines, at decision block 1815, if the selected volume has already been assigned an exclusive condition listed in the table of FIG. 19. If so, the process returns to volume level exclusive condition wizard that may be displayed at the conclusion of processing according to FIG. 18, a "NO" and the nature of the exclusive condition, as indicated at block 1819. Then, the process determines, at decision block 1821 if there are any more logical units in the selected group. If so, processing returns to block 1813; if not, processing determines, at decision block 1823, if there are any more groups. If so, processing returns to block 1811. Processing continues until all logical units in all groups have been tested. Then, the process displays a volume attribute wizard and waits for user input, at block 1825.

An example of volume attribute wizard is illustrated in FIG. 20. In FIG. 20, the group attributes for all volumes that have presassigned exclusive conditions have been turned off. The affected logical units are highlighted, as shown in FIG. 20, and the reason for the change is set forth in a notes column 2011.

Referring again to FIG. 18, after displaying the wizard of FIG. 20, the process waits for user input at block 1825. If the user selects CANCEL button 2013 of FIG. 20, as determined at decision block 1827, the process closes the volume attribute wizard and cancels all operations without having set or changed any group attributes, as indicated at block 1829. If, as determined at decision block 1831, the user selects BACK button 2015 of FIG. 20, the process closes the volume attribute wizard and returns to a previous wizard, as indicated at block 1833. In the illustrated embodiment, processing may return to the wizard of FIG. 17. If, as determined a decision block 1835, the user selects NEXT button 2017 of FIG. 20, processing returns to FIG. 13.

Figure 21:
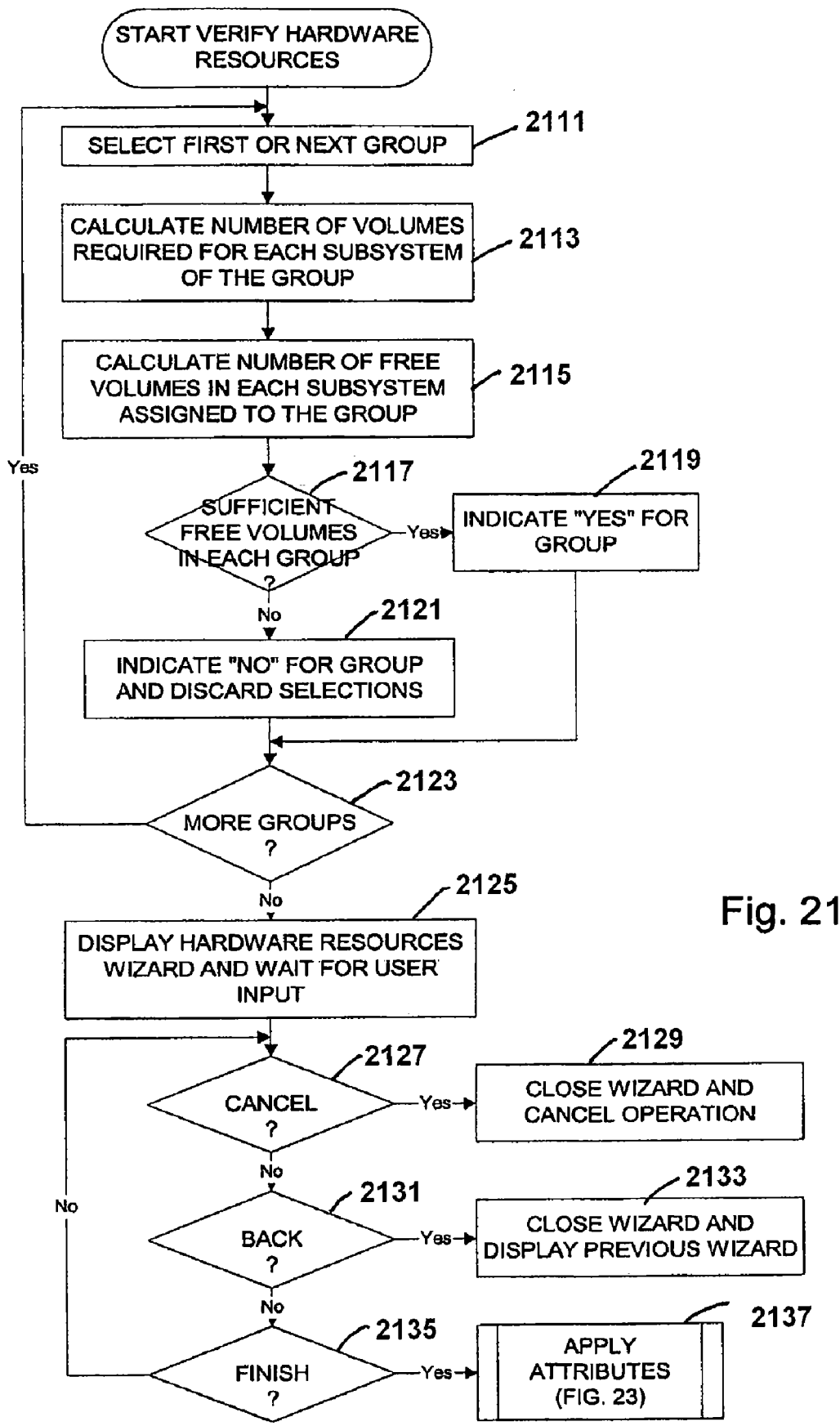
FIG. 21 is a flowchart of a process for verifying hardware resources.

As indicated generally at block 1315 of FIG. 13, a final step of group attribution verification may be verification of hardware resources. Referring to FIG. 21, the process selects a first or next group, at block 2111. The process calculates the number of volumes in each storage subsystem assigned to the group required to implement the selected group attributes, at block 2113. For example, differential snapshots are taken every day and saved for a week. Accordingly, the number of volumes required for a selected number of differential snapshots for a group is the size of a snapshot volume multiplied by the total number of differential snapshots selected multiplied by seven. Then, the process calculates the number of free volumes in each storage subsystem assigned to the group, as indicated at block 2115. Then, the process determines, at decision block 2117, if there are sufficient free volumes in each respective subsystem for the selected number of snapshots. If so, the process indicates "YES" for the group, at block 2119; if not, the process indicates "NO" for the group and cancels the selections, at block 2121. Then, the process tests, at decision block 2123, if there are any more groups. If so, processing returns to block 2111. Processing thus continues until there are no more groups.

After determining the necessary hardware resources, the process displays a hardware resources wizard and waits for user input, at block 2125. An example of a hardware resources wizard is displayed in FIG. 22. As shown in FIG. 22, for each group there is displayed, in OK column 2211, whether or not there are sufficient hardware resources to implement the selected attributes. When there are insufficient resources for a group, a "NO" indication is highlighted. In the example of FIG. 22, Group 1 has insufficient resources. More specifically, storage subsystem serial number 50121 assigned to Group 1 has less currently available storage 2213 than is required, as shown at 2215.

Referring again to FIG. 21, processing waits for the user to a select a button of the wizard of FIG. 22. If, as determined at decision block 2127, the user selects CANCEL button 2217, the hardware resources wizard closes and all operations are cancelled, as indicated at block 2129, with no group attributes having been set or changed. If, as determined at decision block 2131, the user selects BACK button 2219, the hardware resources wizard closes and processing returns to the display of the group attribute selection wizard of FIG. 17, as indicated at block 2133, where the user can change the selected attributes based upon information obtained from the hardware resource wizard. If the user is satisfied with the group attributes and selects FINISH button 2221, as determined at decision block 2135, processing proceeds to attribute application, as indicated generally at block 2137, and described in detail with respect to FIG. 23.

Figure 23:
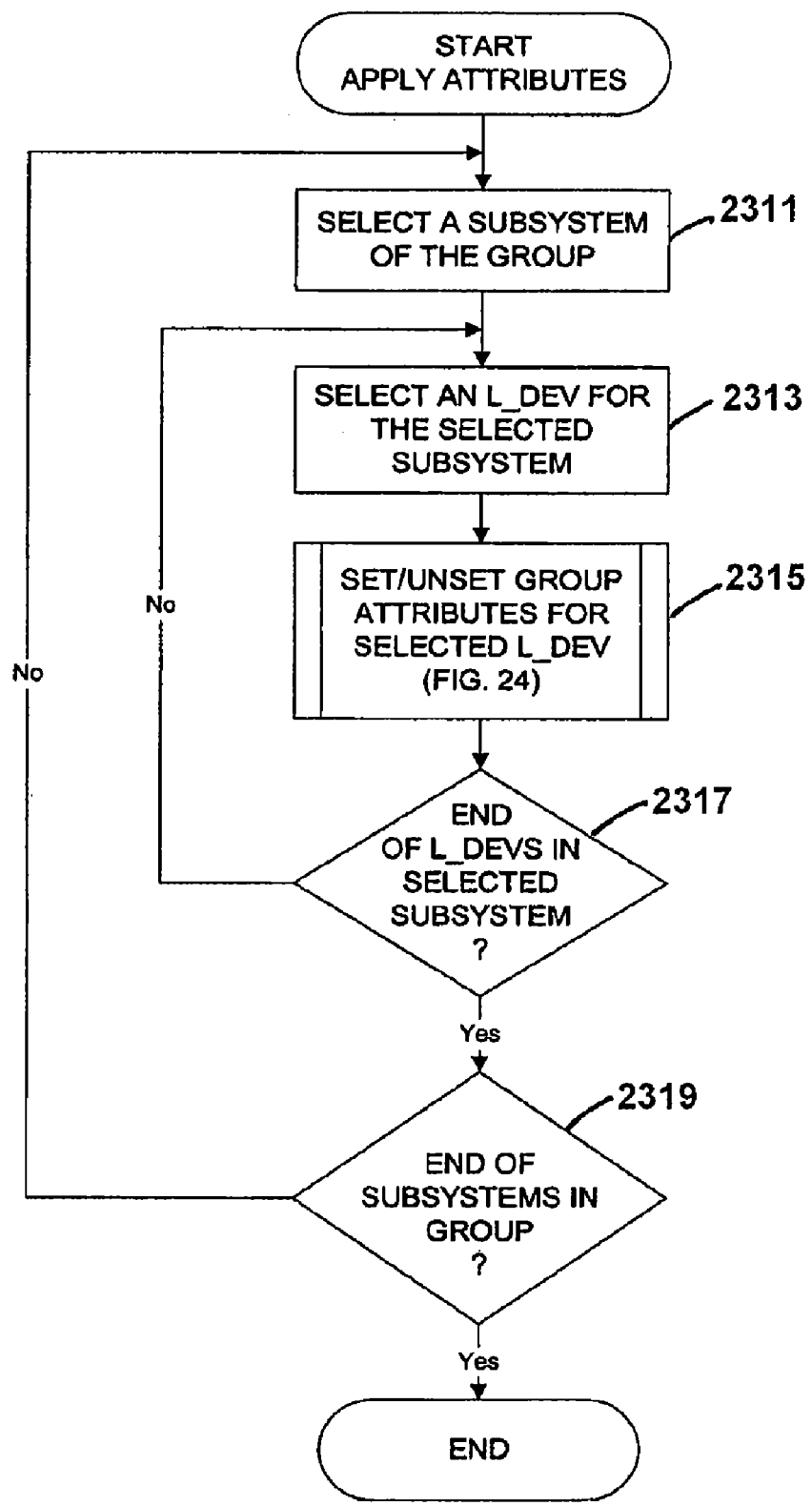
FIG. 23 is a flowchart of a process for applying group attributes.

Referring now to FIG. 23, there are illustrated details of the preferred approach to attribute application processing. First, as indicated at block 2311, the system selects a subsystem of the group, for example using the serial number, for example as shown in FIG. 3. Then, the system selects a Logical Device for the selected subsystem at block 2313. The Logical Units for a storage system are also shown in the table of FIG. 3. The mapping of Logical Unit Numbers to Logical Device Numbers was illustrated in FIG. 4. After selecting a Logical Device at block 2313, the system sets or unsets group attributes for the selected logical devices, as indicated generally at block 2315. (The operations carried out by step 2315 are discussed in conjunction with FIGS. 24A and 24B.) After setting the attributes at block 2315, the system tests, at decision block 2317, if all the Logical Devices in the selected subsystem have been processed. If not, processing returns to block 2313. If, at decision block 2317, the processing has reached the end of the Logical Devices for the selected subsystem, the system tests, at decision block 2319, if all subsystems in the group have been processed. If not, processing returns to block 2311. Thus, processing according to FIG. 23 loops through all subsystems of the group and all of the Logical Devices in each subsystem.

Figure 24A:
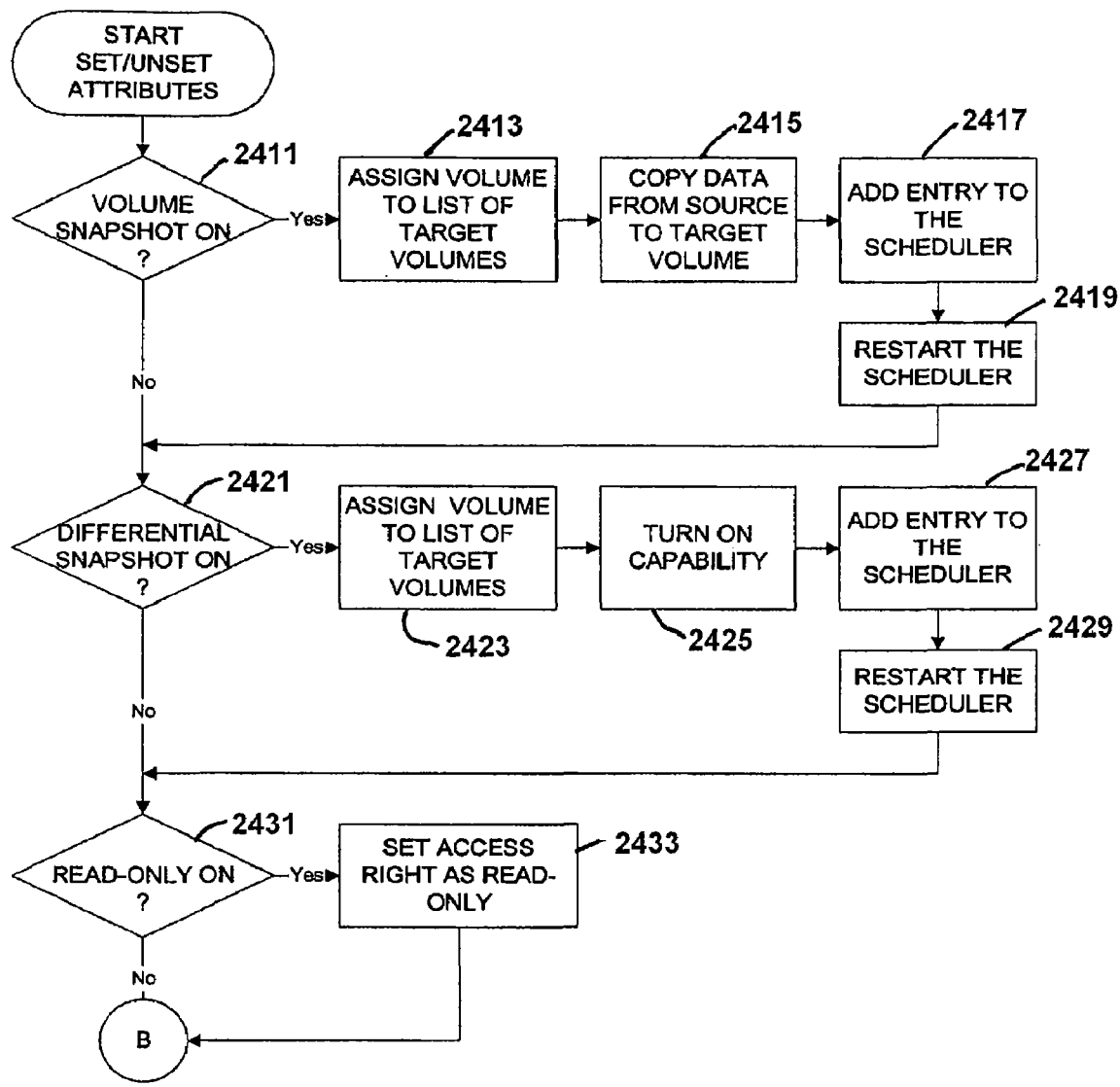
FIGS. 24A and 24B together provide a flowchart for setting and unsetting group attributes.
Figure 24B:
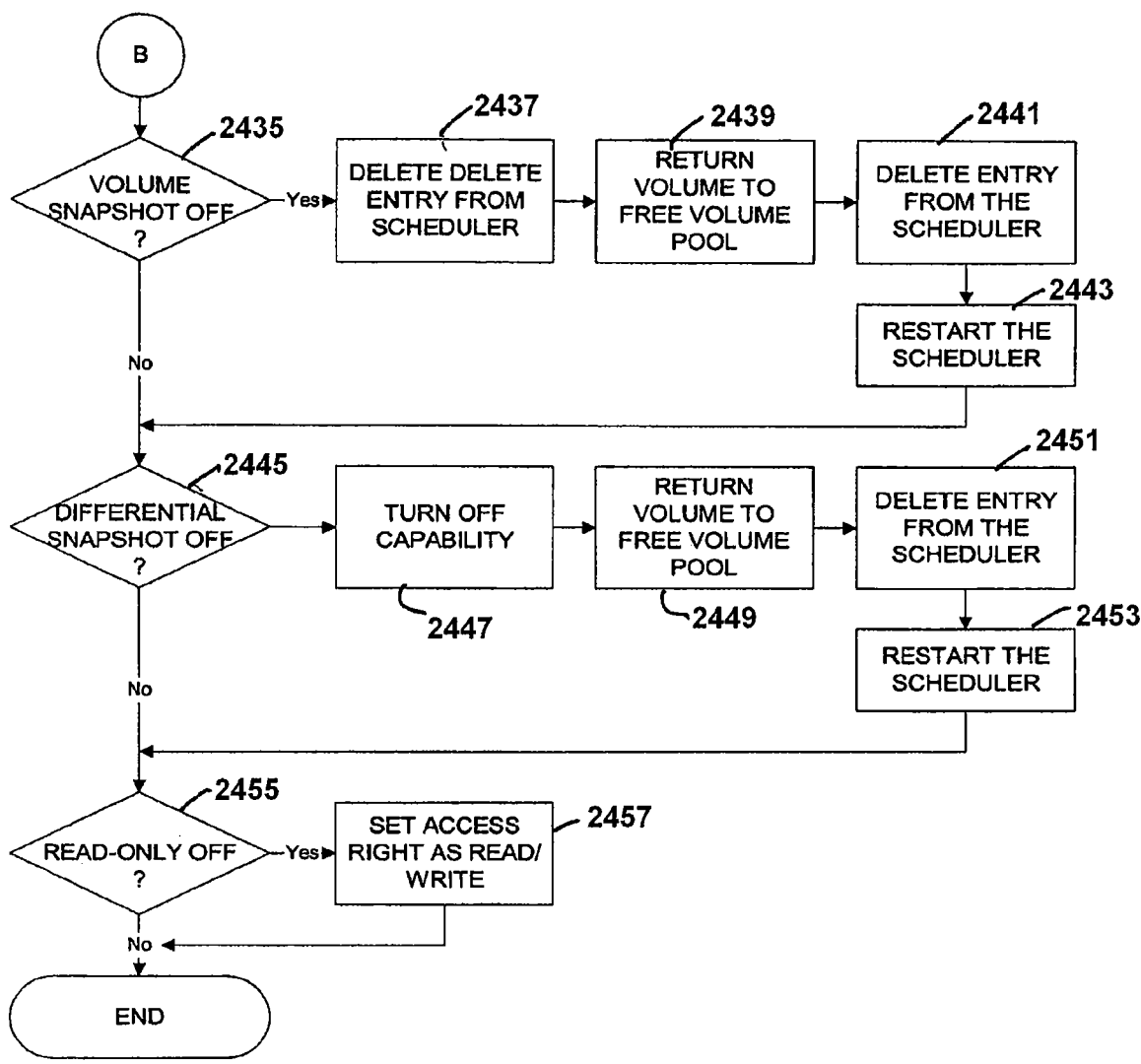

FIGS. 24A and 24B illustrate an example of processing for setting and unsetting group attributes for a selected Logical Device. The system tests, at decision block 2411 if volume snapshot on has been selected. If so, the system transfers a volume from the free volume pool (FIG. 6) to the target volume pool and assigns the volume to the list of target volumes, at block 2413. Then, the system copies data from the source to the target volume, as indicated at block 2415. Then, the system adds an entry to the scheduler, at block 2417 and restarts the scheduler at block 2419.

Next the system tests at decision block 2421 if the differential snapshot has been selected to be ON. If so, the system assigns that volume to the list of target volumes at block 2423 and turns on the differential snapshot capability at block 2425. Then, the system adds an entry to the scheduler at block 2427 and restarts the scheduler at block 2429. If, as indicated at decision block 2431, the read only attribute has been selected for the volume, the system sets the access right to read only at block 2433.

Continuing to FIG. 24B, the system tests at decision block 2435 if the volume snapshot is OFF. If so, the system deletes the entry from the scheduler, at block 2437, returns the volume to the free volume pool at block 2439, deletes the entry from the scheduler at block 2441 and restarts the scheduler at block 2443. If, as indicated at decision block 2445, the differential snapshot attribute is turned OFF, the system turns off the capability at block 2447, returns the volume to the free volume pool at block 2449, deletes the entry from the scheduler at block 2451, and restarts the scheduler at block 2453. If, as indicated at decision block 2455, the read only attribute has been turned OFF for the logical unit, the system sets access to read write at block 2457 and processing ends.

FIG. 25 depicts an exemplary table of attributes that may be controlled using the embodiments of this invention. For each LUN in column 2511 the capacity 2513 is provided followed by the attributes 2515 potentially applicable to that LUN, e.g. volume snapshot, differential snapshot, read-only, etc. Of course any aspect of the storage units can be controlled in this manner.

The foregoing has been a description of the preferred embodiments of a storage system in which attributes are controlled more easily than in conventional storage systems. It will be appreciated that numerous variations may be made in the implementation of such a system. Accordingly, the scope of the invention is defined by the appended claims.

What is claimed is:

1. A method of controlling attributes of a plurality of logical storage volumes, which comprises:
   presenting attribute choices for a group of logical storage volumes defined in a plurality of physical storage devices;
   receiving a selection of attribute choices for the defined group of logical storage volumes over the plurality of physical storage devices;
   in response to selection of attribute choices, verifying the selected attribute choices for each logical storage volume in the group of logical storage volumes; and,
   in response to verification of the selected attribute choices, applying the selected attributes to the group.

2. The method as claimed in claim 1, wherein applying the selected attributes to the group comprises applying the selected attributes to at least one logical storage volume of the group.

3. The method as claimed in claim 1, wherein applying the selected attributes to the group comprises applying the selected attributes to each logical storage volume of the group.

4. The method as claimed in claim 1, wherein each logical storage volume includes a logical unit.

5. The method as claimed in claim 1, wherein the group of logical storage volumes comprises a plurality of storage subsystems, each storage subsystem including at least one logical storage volume of the group.

6. The method as claimed in claim 5, wherein applying the selected attributes to the group comprises:
   selecting a storage subsystem of the group; and
   applying the selected attributes to one logical storage volume included in the selected storage subsystem.

7. The method as claimed in claim 6, including:
   applying the selected attributes to each logical storage volume included in the selected storage subsystem.

8. The method as claimed in claim 7, wherein applying the selected attributes to the group comprises:
   (a) selecting a storage subsystem of the group;
   (b) selecting a logical storage volume of the selected subsystem to which the selected attributes have not been applied;
   (c) applying the selected attributes to the selected logical storage volume; and
   (d) repeating steps (b) and (c) until the selected attributes have been applied all logical storage volumes of the selected storage subsystem.

9. The method as claimed in claim 8, wherein applying the selected attributes to the group further comprises:
   (e) after step (d), selecting a second storage subsystem of the group; and
   (f) performing steps (b) and (c) until the selected attributes have been applied to all logical storage volumes of the second storage subsystem.

10. The method as claimed in claim 1, wherein verifying the selected attribute choices includes:
    determining if there are sufficient hardware resources to implement the selected attribute choices.

11. The method as claimed in claim 10, wherein determining if there are sufficient hardware resources to implement the selected attribute choices includes:
    calculating a number of logical storage volumes required to implement the selected attribute choices in each storage subsystem assigned to the group;
    comparing the calculated number of logical storage volumes to a number of available free logical storage volumes in each said storage subsystem assigned to the group; and,
    displaying the result of comparing the calculated number of logical storage volumes to a number of available free logical storage volumes.

12. The method as claimed in claim 10, including:
    automatically modifying the selected attribute choices in response to a determination that there are insufficient hardware resources to implement the selected attribute choices.

13. The method as claimed in claim 12, including:
    prompting a user to modify the selected attribute choices in response to a determination that there are insufficient hardware resources to implement the selected attribute choices.

14. The method as claimed in claim 1, wherein verifying the selected attribute choices includes:
    determining if there are inconsistencies between selected attribute choices.

15. The method as claimed in claim 14, wherein determining if there are inconsistencies between selected attribute choices includes:
    forming a table of mutually exclusive attributes; and,
    determining if selected attribute choices are mutually exclusive according to said table of mutually exclusive attributes.

16. The method as claimed in claim 14, including:
    prompting a user to modify the selected attribute choices in response to a determination that there are inconsistent selected attribute choices.

17. The method as claimed in claim 1, wherein verifying the selected attribute choices includes:
    determining if a selected attribute choice is inconsistent with a preassigned attribute.

18. The method as claimed in claim 17, wherein determining if a selected attribute choices is inconsistent with a preassigned attribute includes:
    forming a table of attributes that are inconsistent with attribute choices; and;
    determining if any logical storage volume of said group has a preassigned attribute listed in said table of attributes that are inconsistent with attribute choices.

19. The method as claimed in claim 18, including:
    automatically modifying a selected attribute choices in response to a determination that the selected attribute choice is inconsistent with a preassigned attribute.

20. A method of controlling attributes of a plurality of logical storage volumes, which comprises:
    defining a group of logical storage volumes defined in a plurality of physical storage devices;
    presenting attribute choices for the defined group of logical storage volumes to enable selection thereof on a group basis;
    receiving a selection of attribute choices for the defined group of logical storage volumes over the plurality of physical storage devices;
    in response to selection of attribute choices, verifying the selected attribute choices for each logical storage volume in the group of logical storage volumes; and,
    in response to verification of the selected attribute choices, applying the selected attributes to the group of logical storage volumes.

21. The method as claimed in claim 20, wherein applying the selected attributes to the group comprises applying the selected attributes to at least one logical storage volume of the group.

22. The method as claimed in claim 20, wherein applying the selected attributes to the group comprises applying the selected attributes to each logical storage volume of the group.

23. The method as claimed in claim 20, wherein each logical storage volume includes a logical unit.

24. The method as claimed in claim 20, wherein the group of logical storage volumes comprises a plurality of storage subsystems, each storage subsystem including at least one logical storage volume of the group.

25. The method as claimed in claim 24, wherein applying the selected attributes to the group comprises:
    selecting a storage subsystem of the group; and
    applying the selected attributes to one logical storage volume included in the selected storage subsystem.

26. The method as claimed in claim 25, including applying the selected attributes to each logical storage volume included in the selected storage subsystem.

27. The method as claimed in claim 24, wherein applying the selected attributes to the group comprises:
    (a) selecting a storage subsystem of the group;
    (b) selecting a logical storage volume of the selected subsystem to which the selected attributes have not been applied;
    (c) applying the selected attributes to the selected logical storage volume; and
    (d) repeating steps (b) and (c) until the selected attributes have been applied to all logical storage volumes of the selected storage subsystem.

28. The method as claimed in claim 27, wherein applying the selected attributes to the group further comprises:
    (e) after step (d), selecting a second storage subsystem of the group; and
    (f) performing steps (b) and (c) until the selected attributes have been applied to all logical storage volumes of the second storage subsystem.

29. The method as claimed in claim 20, wherein verifying the selected attribute choices includes:
    determining if there are sufficient hardware resources to implement the selected attribute choices.

30. The method as claimed in claim 29, wherein determining if there are sufficient hardware resources to implement the selected attribute choices includes:
    calculating a number of logical storage volumes required to implement the selected attribute choices in each storage subsystem assigned to the group;
    comparing the calculated number of logical storage volumes to a number of available free storage devices in each said storage subsystem assigned to the group; and,
    displaying the result of comparing the calculated number of logical storage volumes to a number of available free storage devices.

31. The method as claimed in claim 29, including:
    automatically modifying the selected attribute choices in response to a determination that there are insufficient hardware resources to implement the selected attribute choices.

32. The method as claimed in claim 29, including:
    prompting a user to modify the selected attribute choices in response to a determination that there are insufficient hardware resources to implement the selected attribute choices.

33. The method as claimed in claim 20, wherein verifying the selected attribute choices includes:
    determining if there are inconsistencies between selected attribute choices.

34. The method as claimed in claim 33, wherein determining if there are inconsistencies between selected attribute choices includes:
    forming a table of mutually exclusive attributes; and,
    determining if selected attribute choices are mutually exclusive according to said table of mutually exclusive attributes.

35. The method as claimed in claim 33, including:
    prompting a user to modify the selected attribute choices in response to a determination that there are inconsistent selected attribute choices.

36. The method as claimed in claim 35, wherein prompting a user to modify the selected attribute choices in response to a determination that there are inconsistent selected attribute choices includes:

displaying a dialog prompting the user to select one of the inconsistent attribute choices.

37. The method as claimed in claim 20, wherein verifying the selected attribute choices includes:

determining if a selected attribute choice is inconsistent with a preassigned attribute.

38. The method as claimed in claim 37, wherein determining if a selected attribute choices is inconsistent with a preassigned attribute includes:

forming a table of attributes that are inconsistent with attribute choices; and;

determining if any logical storage volume of said group has a preassigned attribute listed in said table of attributes that are inconsistent with attribute choices.

39. The method as claimed in claim 37, including:

automatically modifying a selected attribute choices in response to a determination that the selected attribute choice is inconsistent with a preassigned attribute.

40. A system for controlling attributes of a plurality of logical storage volumes, which comprises:

a user interface configured to present a set of attribute choices for a group of logical storage volumes defined in a plurality of physical storage devices and to receive a selection of the attribute choices for the defined group of logical storage volumes over the plurality of physical storage devices;

a system configured to verify selected attribute choices; and, a system configured to apply to the group of logical storage volumes verified attributes chosen from the set of attribute choices.

* * * * *